Figure 1:
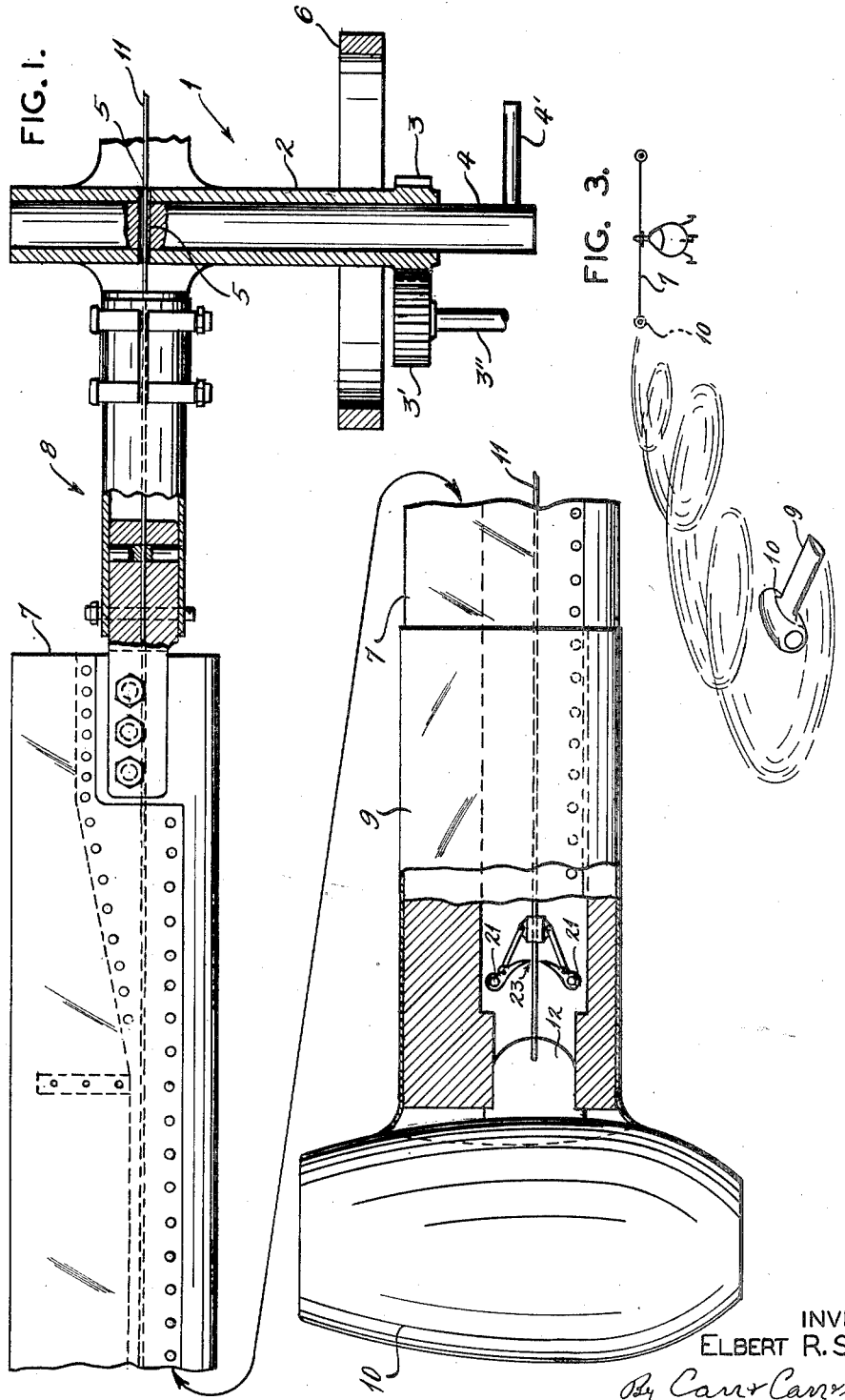

Feb. 1, 1955
E. R. SARGENT
2,701,021
HELICOPTER ROTOR BLADE JET ENGINE
RELEASABLE MOUNTING MECHANISM
Filed July 20, 1950
2 Sheets-Sheet 2
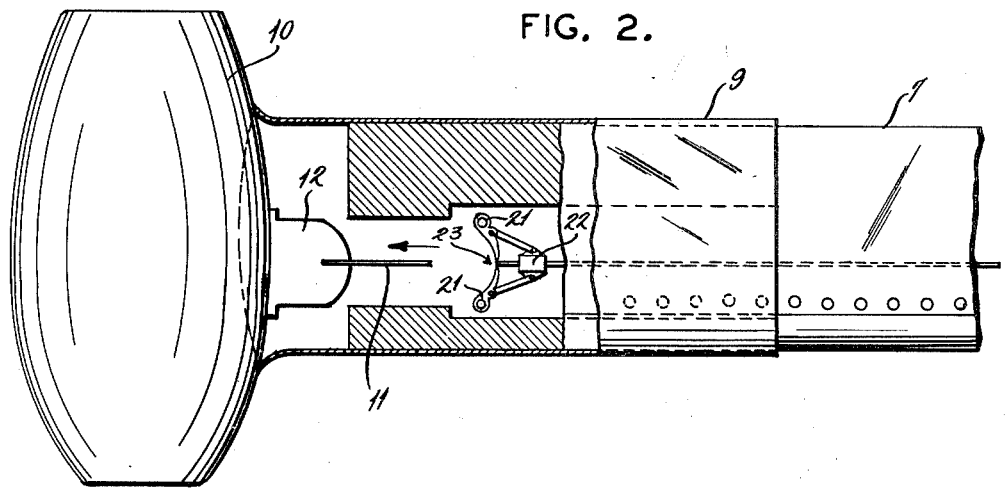
FIG. 2.
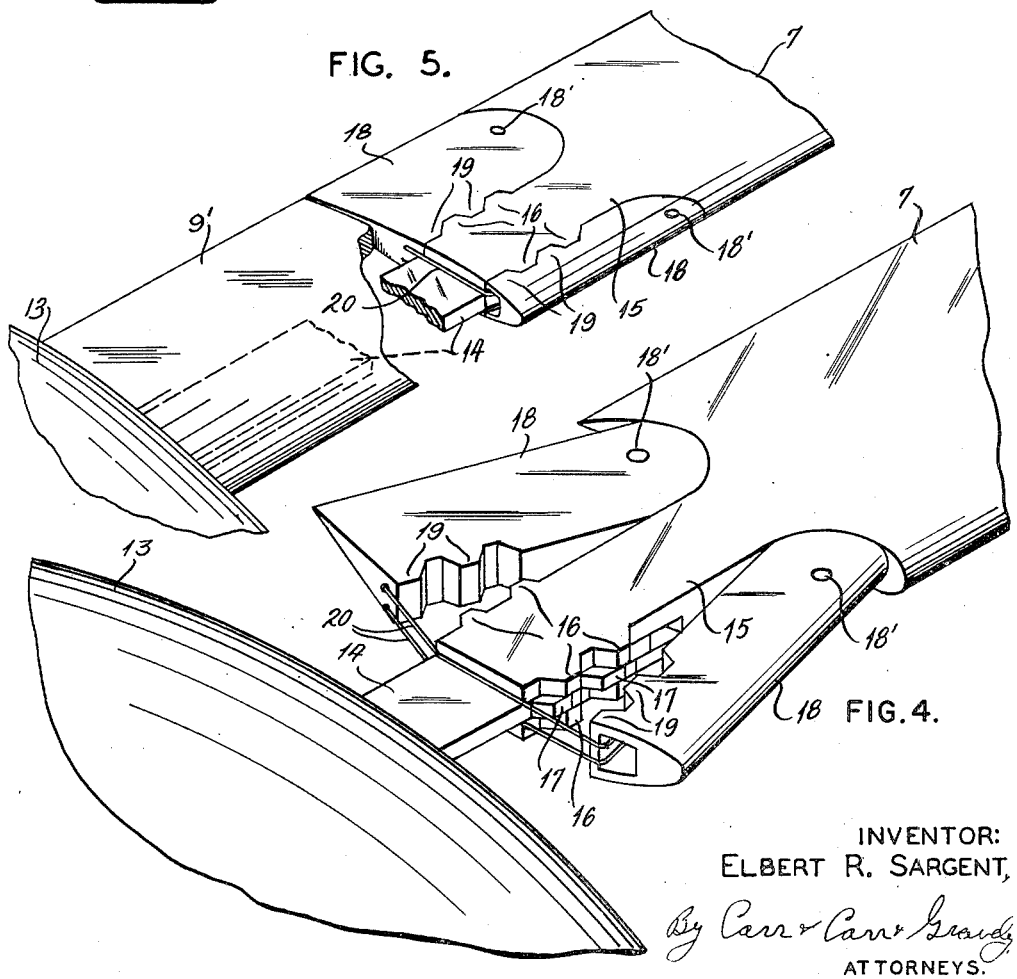
FIG. 5.
FIG. 4.
INVENTOR:
ELBERT R. SARGENT,
By Carr & Carr & Grandy
ATTORNEYS.

United States Patent Office 2,701,021
Patented Feb. 1, 1955

2,701,021

HELICOPTER ROTOR BLADE JET ENGINE RELEASABLE MOUNTING MECHANISM

Elbert R. Sargent, Ferguson, Mo., assignor to McDonnell Aircraft Corporation, St. Louis, Mo., a corporation of Maryland Application July 20, 1950, Serial No. 174,912

5 Claims. (Cl. 170—135.4)

This invention relates to helicopters and is more particularly directed to mechanism for releasing engines from the tips of rotor blades during flight and after the engine has been disabled.

The primary object of the invention is to provide a mounting for a releasable rotor blade tip mounted engine in which means are provided, controlled by the pilot, for releasing the engine from the wing tip.

Another object of the invention is to provide a mounting for a jet engine that may be detached from the rotor blade during flight and which will enable the released engine to safely descend to earth.

A further object of the invention is to provide means for mounting a jet engine on the tip of a helicopter rotor blade in which the mounting may be released during flight, thus permitting the engine and mounting to auto-rotate to earth.

The invention consists in the provision of a cuff or sleeve to which an engine is secured, that is mounted on the tip of the rotor blade and detachable therefrom during flight, thus permitting the engine and cuff to autorotate to earth.

The invention further consists in the provision of mechanism for securing a cuff or sleeve to the rotor blade, which mechanism can be released by the pilot after the engine has become disabled or otherwise ceases to operate.

The invention also consists in the provision of a cable for securing a sleeve or cuff and the engine supported thereby on the helicopter rotor blade, and in which cutting means, controlled by the operator, is provided for severing the cable, thereby permitting release of the engine and sleeve from the rotor blade and enabling said engine and sleeve to autorotate to earth.

In the drawings:

Fig. 1 is a view of a rotor blade assembly, partly in section, embodying the invention, Fig. 2 is a sectional view of the blade tip after severance of the engine cable, Fig. 3 is a view showing the mode of descent of the released engine and its mounting, Fig. 4 is a perspective view showing a modified form of engine holding means; and Fig. 5 is a perspective view of the engine holding means in locked position in the rotor blade.

The invention is embodied in the structure set forth in the several views of the drawings in which the numeral 1 designates a shaft assembly consisting of a tubular shaft 2 having a gear 3 connected thereto and meshing with a gear 3′ secured to a shaft 3″ for driving suitable indicating mechanism for the rotor. A solid shaft 4 is disposed within the tubular shaft 2, each shaft having an aperture 5 therein, said apertures being maintained in alignment. The shaft assembly 1 is suitably supported in a ring 6 adapted for mounting on the fuselage of the helicopter and for tilting movement in a manner similar to that illustrated in co-pending application Zakhartchenko, Serial No. 7,129, filed February 9, 1948, entitled "Helicopter" and now Patent No. 2,689,011.

A rotor blade 7 is secured to the tubular shaft 2 by means of a connecting mechanism 8 which permits the rotor blade to be tilted as well as rotated about an axis perpendicular to the axis of the shaft assembly 1, as is customary in the art. A sleeve 9 is telescopically associated with the rotor blade 7 at its outboard end, a jet engine 10 being secured to the sleeve 9. A cable 11 is anchored to the engine 10 by being directly connected to boss 12 integral with the engine. The cable 11 extends longitudinally of the blade 7, then through the connecting mechanism 8, and finally through apertures 5. The opposite end of cable 11 is anchored to another and similar engine 10 for a rotor blade 7 like the one shown in Fig. 1. Since the engine 10, rotor blade 7, blade connection 8 and cable 11 are similar to those parts shown in Fig. 1, it is deemed unnecessary to show the same.

In the event of failure of the engine 10, it is necessary to detach the engine from blade 7 because autorotation of the rotor will be impeded thereby. After the engine has been detached from the rotor blade, the rotor will autorotate in the intended manner, thereby permitting safe descent of the helicopter. The detachment of engine 10 is accomplished by holding the solid shaft 4 against rotation by handle 4′ or other suitable means while permitting the tubular shaft 2 to continue its rotation. This relative motion will shear the cable 11, thereby permitting the sleeve 9 and the engine 10 to become detached from the rotor blade 7. The engine 10 and sleeve 9 will autorotate to earth in the manner of a maple leaf, as shown in Fig. 3. It is, of course, obvious that both of the engines 10 will be released so that the rotor will be balanced. This autorotation will prevent destruction of the engine and sleeve so that they can be salvaged and installed on the helicopter rotor blade after descent of the vehicle has been accomplished. The action shown by Fig. 3 for one blade tip engine 10 is deemed sufficient to show how both blade tip engines will act when released, the release of both engines being accomplished at the same time.

A modified form of the invention is illustrated in Figs. 4 and 5 in which the shaft assembly 1 and rotor blade 7 are identical to that described above. The mode of securing the engine 13 thereto is by means of a bracket 14 telescopically fitted into the outboard end of the rotor blade 7. The blade is provided with a stem 15 of a width substantially the same as that of bracket 14. The stem 15 is longitudinally slotted or bifurcated, as shown in Fig. 4, to embrace bracket 14. Teeth or serrations 16 are formed on opposite sides of the stem 15 and teeth or serrations 17 are formed on opposite sides of the bracket 14. When the bracket is properly installed in the end of the rotor blade 7, teeth or serrations 16 and 17 will be in alignment. The stem 15 and bracket 14 are locked in position by means of levers 18 pivotally secured to the blade 7 on pins 18′ and disposed on opposite sides of the stem 15. The levers 18 are provided with teeth or serrations 19 that mesh with teeth or serrations 16 and 17, thus locking the bracket 14 securely to the outboard end of the rotor blade 7. The levers 18 are held in locked position by means of cables 20, one end of which is secured to one of the levers 18 and then led through the other lever 18, thence longitudinally of the rotor blade 7 and through aperture 5 in a manner similar to the cable 11.

If, for any reason, the engine 13 (Figs. 4 and 5) fails to continue operation, it will become necessary to detach it and the companion engine (not shown) from the outboard ends of the rotor blade 7 in order that the helicopter may safely autorotate to earth. The release of both engines 13 is obtained when the cables 20 are severed in a manner similar to that described in connection with severance of cable 11. It is particularly noted in Figs. 4 and 5 that no sleeve, as sleeve 9 in Fig. 1, is used over the connection between the blade 7 and the bracket 14 on engine 13 so that the action of the levers 18 will not be adversely affected. However, the engines 13 do have the abbreviated air-foil sleeve 9′ over a part of the bracket 14.

Once the cables 20 have been severed, by means shown in Figs. 1 and 2 or similar means, it will be appreciated that the forces in such a rotating system will tend to peel-off the engines in a backward and outward direction relative to the motion of the blade 7. This tendency for the engines 13 to peel-off as stated arises by reason of the high drag characteristic of the engines when not functioning as a thrust producer, and the centrifugal force on the engines created in the rotating system. Each lever 18 has its pivot 18′ located in connection with the blade 7 so that it is the center of the arcuate surfaces adjacent the inner end of such lever. Thus each lever 18 can easily pivot outwardly (Fig. 4) to disengage its teeth 19 from the companion teeth 17 on the bracket 14 and teeth 16 on blade stem 15. Also, the close fit at these arcuate surfaces is needed to keep a smooth flow at these portions of the blades.

Since the engines 13 peel-off as described, the pivoting action of levers 18 is intended to avoid interference between the blade stem 15 and the engine bracket 14. In such a rotating system where the engines 13 produce a driving thrust upon the blade 7, the major force resisted by the levers 18 is that directed radially outwardly. Stated differently, in normal operation the levers 18 are working mostly in tension and the cables 20 merely hold the levers against spreading. However, when an engine fails in its function the load due to its drag is taken mostly by the trailing edge lever 18. Therefore, if the pilot cannot restart the engine he may jettison the engines entirely and retain a rotating blade having controllable autorotative characteristics. The jettisoning action has been noted, that is to say the engine bracket 14 will disconnect backwardly from the stem 15 by pivoting the trailing edge lever 18. If there should be any forward movement of the extreme inner end of bracket 14, such movement would tend to move the leading edge lever 18. The view of Fig. 4 exaggerates the movement of the leading edge lever 18 to afford a better view of the shape of the parts in the assembly.

The embodiment of the invention illustrated in Fig. 1 allows a substantial length of cable 11 to remain secured to the engine 10 and boss 12. This trailing length of cable will materially affect the autorotation ability of the engine and sleeve. Means are associated with the rotor blade 7 for severing the excess cable, which comprises a pair of cutting elements 21 pivotally mounted near the outboard end of the rotor blade. A bracket 22 is supported on the cable 11 and pivotally connected to the cutting elements 21. As soon as the cable 11 has been severed, the cutting elements 21 will be drawn toward each other and since cable 11 passes therebetween, it will be severed at point 23, the point at which the cutting edges of elements 21 meet. This permits the engine 10 and sleeve 9 to autoroate without trailing an excess length of cable.

The sleeve 9 and engine 10, as well as the bracket 14 and engine 13, are designed to have their centers of gravity so positioned that the sleeve and the engine will rotate about said center, thus causing autorotation thereof, as illustrated in Fig. 3. As indicated above, this action is similar to that of a falling maple leaf so that the rate of descent is materially reduced. The engine and the sleeve or bracket associated therewith may be salvaged and reused. This permits the helicopter rotor to autorotate and remain in balance, thereby preventing its destruction while in the process of autorotation.

The engine illustrated in Fig. 4 is to be constructed with a sleeve 9' (Fig. 5) similar to that shown in Figs. 1 and 2. The releasing mechanism, best seen in Fig. 4, is disposed some distance from the outboard end of the rotor blade in order that the sleeve 9' may not interfere with the action of the releasing means. The sleeve has been omitted from the Fig. 4 disclosure in order to more clearly illustrated the releasing mechanism, but it should be clear that the bracket 14 may be suitably lengthened to dispose the engine 13 sufficiently beyond the end of the blade 7 and releasing means 18 to avoid interference with the movement of the same.

What I claim is:

1. Jet engine mounting means for a helicopter rotor comprising a rotor blade, a jet engine, an engine mounting bracket fixed to said engine, a stem carried by the outboard end of said rotor blade, serrations on said mounting bracket and stem having matching profiles, said engine being mounted on the blade with said bracket and stem engaged and with said serrations in registry whereby said engine is supported at the outboard end of said rotor blade, means carried along the blade leading edge having serrations complementary to the serrations on said mounting bracket, a lever pivoted to said rotor blade to move into and out of a closed position with respect to said stem, serrations on said lever having a profile complementary to said mounting bracket and stem serrations, and a cable carried by and extending longitudinally of said rotor blade, said cable being attached to said lever to hold said lever in its closed position with its serrations meshing with said serrations on said mounting bracket and stem, said leading edge means and said lever cooperating for retaining said engine on said rotor blade.

2. The jet engine mounting means for a helicopter rotor as set forth in claim 1, wherein said lever is pivoted adjacent the trailing edge of said rotor blade.

3. The jet engine mounting means for a helicopter rotor as set forth in claim 1, wherein said leading edge means is pivoted to said rotor blade to move into and out of a closed position adjacent said stem, said pivoted lever and leading edge means being disposed on opposite sides of said stem adjacent the leading and trailing edges of said rotor blade, and said cable being connected with both of said leading edge means and lever for retaining said levers in closed position to hold said engine on said rotor blade.

4. The jet engine mounting means for a helicopter rotor as set forth in claim 1, wherein said stem is longitudinally slotted to receive said mounting bracket in sliding relation therein longitudinally of said rotor blade.

5. The jet engine mounting means for a helicopter rotor as set forth in claim 1, and further comprising a tubular shaft connected for rotating said rotor blade, shaft means carried in said tubular shaft and normally rotating therewith, said tubular shaft and shaft means carried therewith having normally registering apertures therein, said lever holding cable being extended longitudinally through said rotor blade and through said registering apertures, and handle means connected with said shaft means for arresting rotation thereof with said tubular shaft to relatively displace said registering apertures and shear said cable for releasing said lever means retaining said engine on said rotor blade.

References Cited in the file of this patent

UNITED STATES PATENTS

| 1,799,664 | Williams | Apr. 7, 1931 |
| 2,375,423 | Lobelle | May 8, 1945 |
| 2,375,858 | Makaroff | May 15, 1945 |
| 2,421,699 | Johnson | June 3, 1947 |
| 2,426,537 | Van Dorn | Aug. 26, 1947 |
| 2,438,151 | Davis | Mar. 23, 1948 |
| 2,514,749 | Dobbins | July 11, 1950 |
| 2,537,369 | Ostroff | Jan. 9, 1951 |
| 2,547,226 | Michael | Apr. 3, 1951 |
| 2,591,913 | Bowers et al. | Apr. 8, 1952 |